US010823996B2

(12) United States Patent
 Zhu et al.

(10) Patent No.: US 10,823,996 B2
(45) Date of Patent: Nov. 3, 2020

(54) DISPLAY PANEL AND METHOD OF MANUFACTURING THE SAME, DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jianguo Zhu, Beijing (CN); Fangyi Liu, Beijing (CN); Yangli Zheng, Beijing (CN); Xiaoping Zhang, Beijing (CN); Xingpan Sun, Beijing (CN); Le Zhang, Beijing (CN); Yaodong Wang, Beijing (CN); Yang Zhang, Beijing (CN); Luo Zhang, Beijing (CN); Jiazhen Liu, Beijing (CN); Yizhe Li, Beijing (CN); Hui Yin, Beijing (CN); Qi Jing, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/402,916

(22) Filed: May 3, 2019

(65) Prior Publication Data
 US 2019/0346712 A1  Nov. 14, 2019

(30) Foreign Application Priority Data
 May 8, 2018 (CN) .......................... 2018 1 0433171

(51) Int. Cl.
 *G02F 1/1333* (2006.01)
 *G02F 1/1335* (2006.01)
 (Continued)

(52) U.S. Cl.
 CPC .... *G02F 1/133308* (2013.01); *G02F 1/13452* (2013.01); *G02F 1/133514* (2013.01);
 (Continued)

(58) Field of Classification Search
 None
 See application file for complete search history.

(56) References Cited

U.S. PATENT DOCUMENTS 5,436,745 A * 7/1995 Voisin ............... G02F 1/133382
 349/150
2011/0304571 A1* 12/2011 Kim .................... G02F 1/13338
 345/173

(Continued)

*Primary Examiner* — Ryan Crockett
(74) *Attorney, Agent, or Firm* — McDermott Will & Emery LLP

(57) ABSTRACT

A display panel includes a cover plate, an array substrate, and an opposite substrate. The array substrate is disposed between the cover plate and the opposite substrate. An edge of a surface of the array substrate away from the cover plate includes a bonding region for bonding at least one circuit, and a portion of a surface of the array substrate close to the cover plate corresponding to the bonding region is fixedly connected to the cover plate. The opposite substrate is assembled face to face with the array substrate.

13 Claims, 4 Drawing Sheets

(51) Int. Cl.
*G02F 1/1345* (2006.01)
*G02F 1/1368* (2006.01)

(52) U.S. Cl.
CPC ...... *G02F 1/133528* (2013.01); *G02F 1/1368* (2013.01); *G02F 2001/133325* (2013.01); *G02F 2001/133331* (2013.01); *G02F 2001/133562* (2013.01); *G02F 2001/133567* (2013.01); *G02F 2202/28* (2013.01)

(56) References Cited

U.S. PATENT DOCUMENTS

| | | | |
|---|---|---|---|
| 2012/0101202 A1* | 4/2012 | Chang | C08G 18/10 524/261 |
| 2013/0148072 A1* | 6/2013 | Jang | G02F 1/13439 349/150 |
| 2016/0039179 A1* | 2/2016 | Yoshida | B32B 7/12 428/189 |
| 2019/0122897 A1* | 4/2019 | Barry | H01L 24/82 |

* cited by examiner description thereof are used to explain the present disclosure, and do not constitute improper limitations of the present disclosure.

DISPLAY PANEL AND METHOD OF MANUFACTURING THE SAME, DISPLAY DEVICE

CROSS-REFERENCE TO RELATED APPLICATION

This application claims priority to Chinese Patent Application No. 201810433171.1, filed on May 8, 2018, titled "DISPLAY PANEL AND METHOD OF MANUFACTURING THE SAME, DISPLAY DEVICE", which is incorporated herein by reference in its entirety.

TECHNICAL FIELD

The present disclosure relates to the field of display technologies, and more particularly, to a display panel and a method of manufacturing the same, and a display device.

BACKGROUND

The liquid crystal display panel has become one of the mainstream display panels in the display field due to its low power consumption, low manufacturing cost and no radiation.

The liquid crystal display panel generally includes a color film substrate and an array substrate disposed in sequence from a display side of the liquid crystal display panel to a back side thereof, and a liquid crystal layer is sandwiched between the color film substrate and the array substrate. A surface of the array substrate close to the color film substrate has a bonding area for bonding an integrated circuit (IC) or a flexible printed circuit (FPC).

SUMMARY

In a first aspect, a display panel is provided, which includes a cover plate, an array substrate, and an opposite substrate. The array substrate is disposed on a side of the cover plate. An edge of a surface of the array substrate away from the cover plate includes a bonding region for bonding at least one circuit. A portion of a surface of the array substrate close to the cover plate corresponding to the bonding region is fixedly connected to the cover plate. An opposite substrate is disposed on a side of the array substrate away from the cover plate, and is assembled with the array substrate.

In some embodiments, the opposite substrate is a color film substrate, and the color film substrate does not cover the bonding region.

In some embodiments, a portion of the surface of the array substrate close to the cover plate corresponding to the color film substrate is fixedly connected to the cover plate.

In some embodiments, the display panel further includes a first polarizer disposed on a side of the array substrate close to the cover plate, and an optically clear adhesive layer disposed between the first polarizer and the cover plate. The optically clear adhesive layer is used for bonding the first polarizer to the cover plate.

In some embodiments, the first polarizer completely covers or partially covers the surface of the array substrate close to the cover plate.

In some embodiments, the optically clear adhesive layer completely covers or partially covers a surface of the first polarizer away from the array substrate.

In some embodiments, the display panel further includes a liquid crystal layer disposed between the array substrate and the color film substrate; and a second polarizer disposed on a side of the color film substrate away from the array substrate.

In some embodiments, the display panel further includes an optically clear adhesive layer disposed between the array substrate and the cover plate, and the optically clear adhesive layer is used for bonding the surface of the array substrate close to the cover plate to the cover plate.

In some embodiments, the optically clear adhesive layer completely covers or partially covers the surface of the array substrate close to the cover plate.

In some embodiments, the display panel further includes at least one circuit bonded to the bonding region of the array substrate, and a glue protection layer coated on the bonding region of the array substrate. The glue protection layer does not cover or partially covers the at least one circuit.

In some embodiments, one of the at least one circuit protrudes from the edge of the surface of the array substrate away from the cover plate, and the display panel further comprises a Kapton tape for bonding the one of the at least one circuit to an end portion of the array substrate having the bonding region.

In a second aspect, a method of manufacturing a display panel is provided, which includes: providing an array substrate, an edge of a surface of the array substrate including a bonding region; placing a cover plate on another surface of the array substrate opposite to the bonding region, and fixedly connecting a portion of the another surface of the array substrate corresponding to the bonding region to the cover plate; and providing an opposite substrate, and assembling the opposite substrate with the array substrate.

In some embodiments, assembling the opposite substrate with the array substrate, includes: placing the opposite substrate on a side of the array substrate including the bonding region in a way that the opposite substrate does not cover the bonding region after being assembled.

In some embodiments, placing the cover plate on another surface of the array substrate opposite to the bonding region, includes: coating an optically clear adhesive layer on the another surface of the array substrate opposite to the bonding region, so as to bond the array substrate to the cover plate via the optically clear adhesive layer; or, attaching a first polarizer to the another surface of the array substrate opposite to the bonding region, and coating an optically clear adhesive layer on a surface of the first polarizer away from the array substrate, so as to bond the array substrate to the cover plate via the optically clear adhesive layer.

In some embodiments, before coating the optically clear adhesive layer, the method further includes: bonding at least one circuit to the bonding region; and coating a glue protection layer on a portion of a surface of the bonding region not covered by the at least one circuit, or, coating a glue protection layer on a portion of the at least one circuit and the portion of the surface of the bonding region not covered by the at least one circuit.

In a third aspect, a display device is provided, which includes the display panel provided in the above aspect, and a backlight module. The backlight module is disposed on a back side of the display panel that is opposite to a display side thereof.

BRIEF DESCRIPTION OF THE DRAWINGS

The accompanying drawings described herein are intended to provide a further understanding of the present disclosure and constitute a part of the present disclosure. The illustrative embodiments of the present disclosure and the description thereof serve to explain the present disclosure, but do not constitute an undue limitation of the present disclosure. In the accompanying drawings.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

In order to further describe a display panel and a method of manufacturing the same, and a display device provided by some embodiments of the present disclosure, a detailed description is given below with reference to the accompanying drawings.

With the development of display technology, users are demanding higher-quality display panels in mobile terminals such as mobile phones and tablet computers. As a result, display panels with good visual effects and high reliability have gradually become the main development trend. In order for the display panels to meet users' requirements for higher and higher quality, after the manufacturing process, it is usually necessary to perform more rigorous tests, such as compression test and drop test, on the display panels to determine their mechanical properties, so as to optimize the display panels based on the test results.

Figure 1:
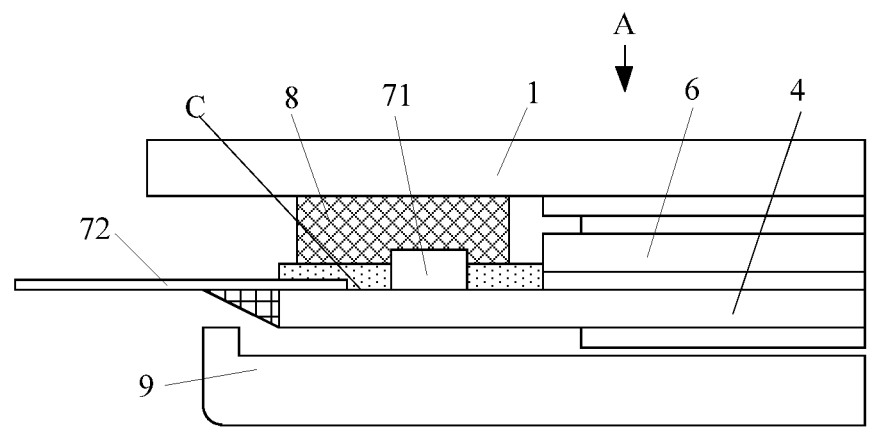
FIG. 1 is a schematic diagram showing a structure of a liquid crystal display module in the related art.

A structure of a liquid crystal display panel in the related art is shown in FIG. 1. The liquid crystal display panel includes a cover plate 1, a color film substrate 6, an array substrate 4, and a backlight module 9, which are sequentially arranged from a display side A to a back side of the display panel. The array substrate 4 has a bonding region C that is a part, which is not covered by the color film substrate 6, of a surface of the array substrate 4 close to the color film substrate 6, and the bonding region C is used to bond, for example, an integrated circuit (IC) 71 and a flexible printed circuit (FPC) 72 thereon. There is a gap between the bonding region C and the cover plate 1. After the IC 71 and the FPC 72 are bonded onto the bonding region C, the gap is filled with a filler 8 such as foam or silicone glue. The term "display side A" refers to a side of the cover plate 1 away from the color film substrate 6.

After being subjected to more rigorous tests to the mechanical properties, the liquid crystal display panel may be found to be of poor reliability. This is because an end portion of the array substrate 4 having the bonding region C will sway up and down under an action of an external force.

The reason why the end portion of the display panel having the bonding region C will sway up and down under the action of an external force is described below. With continued reference to FIG. 1, the color film substrate 6 is disposed between the array substrate 4 and the cover plate 1, and does not cover the bonding region C. Therefore, there is a gap between the bonding region C and the cover plate 1. Moreover, the IC and the FPC are bonded onto the bonding region C, and thus it is difficult for the filler 8 to completely fill the gap between the bonding region C and the cover plate 1. In addition, poor accuracy of a filling device may affect a filling accuracy of the filler 8. That is, the filler 8 may not be filled to an accurate position. Consequently, the filler 8 may not be able to uniformly and stably support the cover plate 1 and the bonding region C of the array substrate 4.

In addition, the backlight module 9 is not fixedly connected to the array substrate 4 by bonding. This is because the backlight module 9 is made of a polymer material such as plastic, and generally, an adhesive will corrode a plastic backlight module. In a case where the backlight module 9 is connected to the array substrate 4 by bonding, the backlight module will not be firmly bonded to the array substrate made of glass. As a result, the backlight module may be separated from the array substrate, thereby causing damage to the backlight module. Accordingly, a portion of the second surface of the array substrate 4 corresponding to the bonding region C may not be fixedly connected to the backlight module 9.

In this way, when the liquid crystal display panel is subjected to more rigorous tests to the mechanical properties, the bonding region C of the array substrate 4 is easily damaged due to uneven force. In addition, when the liquid crystal display panel is subjected to an external force such as a pressing force or an impact force (for example, the liquid crystal display panel falls on the ground), since the end portion of the array substrate 4 having the bonding region C cannot be stably supported by the filler and the backlight module, the end portion of the array substrate 4 having the bonding region C may sway up and down in a direction perpendicular to the surface of the array substrate 4, thereby affecting the reliability of the liquid crystal display panel. For example, the liquid crystal display panel may not display normally.

Figure 2:
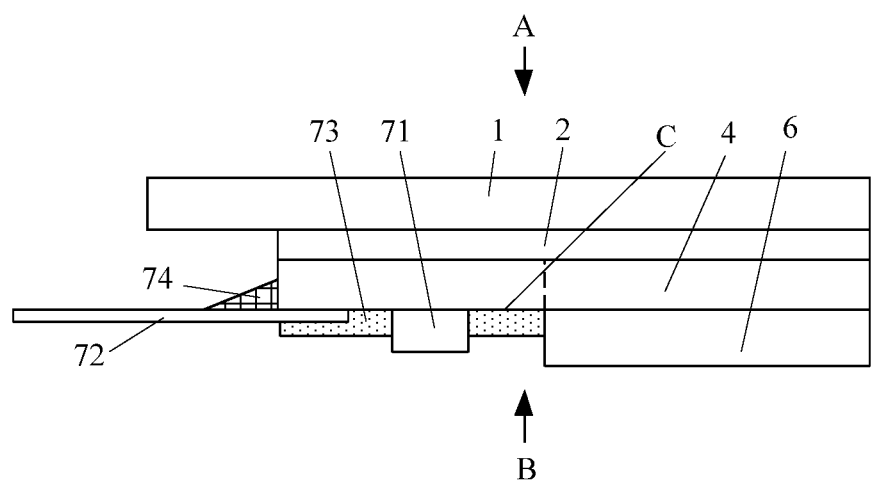
FIG. 2 is a schematic diagram showing a structure of a display panel, in accordance with some embodiments.
Figure 3:
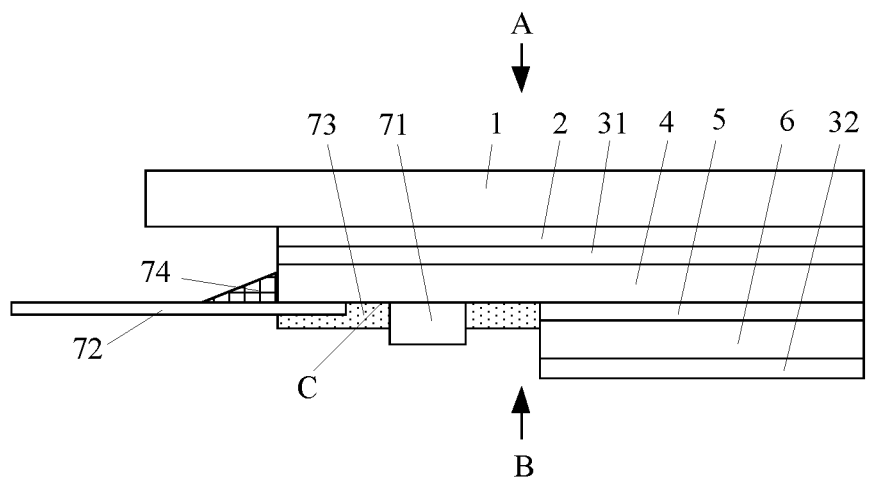
FIG. 3 is a schematic diagram showing a structure of another display panel, in accordance with some embodiments.

Referring to FIGS. 2 and 3, some embodiments of the present disclosure provide a display panel, which includes a cover plate 1, an array substrate 4, and a color film substrate 6 that are sequentially arranged from a display side A of the display panel to a back side B of the display panel. An edge of a surface of the array substrate 4 away from the cover plate 1 includes a bonding region C, and the color film substrate 6 does not cover the bonding region C. A portion of a surface of the array substrate 4 close to the cover plate 1 corresponding to the bonding region is fixedly connected to the cover plate 1. Herein, the color film substrate 6 is an example of an opposite substrate that is assembled face to face with the array substrate.

With continued reference to FIGS. 2 and 3, the array substrate 4 and the color film substrate 6 are attached to each other. The display side A of the display panel refers to a side of the cover plate 4 away from the color film substrate 6, and the back side B of the display panel refers to a side of the color film substrate 6 away from the array substrate 4, i.e., a side at which the backlight module is to be disposed.

In the display panel, the cover plate 1, the array substrate 4, and the color film substrate 6 are sequentially arranged from the display side A of the display panel to the back side B of the display panel, such that the bonding region C of the array substrate 4 is disposed in a surface of the array substrate 4 away from the cover plate 1. That is, the bonding region C is disposed in a surface of the array substrate 4 that faces the color film substrate 6, and is not covered by the color film substrate 6. Moreover, a portion of a surface of the array substrate 4 close to the cover plate 1 corresponding to the bonding region is fixedly connected to the cover plate 1. In this way, at least one bonding circuit may be disposed on the bonding region C of the array substrate 4, and it is not necessary to reserve space at a side of the array substrate 4 that faces the display side A. That is, there will be no gap between the array substrate 4 and the cover plate 1. Therefore, the portion of the surface of the array substrate 4 close to the cover plate 1 corresponding to the bonding region C is fixedly connected to the cover plate 1, for example, via an optical element having a planar structure. Thus, the cover plate 1 serves as a fixed support for the bonding area C of the array substrate 4. In this way, it may be ensured that the end portion of the array substrate 4 having the bonding region C will not easily sway or break under the action of an external force in more rigorous tests to the mechanical properties, thereby improving the reliability of the display panel.

In addition, in the display panel, there is no need to use a filler 8 such as foam or silicone glue shown in FIG. 1 to fill a gap. Therefore, with this design, not only the types of raw materials of the display panel may be reduced and production cost may be lowered, but also a manufacturing process of the display panel may be simplified, and production efficiency of the display panel may be improved.

The cover plate 1 is disposed on a side of the array substrate 4 that faces the display side A, and the cover plate 1 is, for example, a glass cover plate for display or a glass cover plate for touch display. It will be noted that a portion of the surface of the array substrate 4 close to the cover plate 1 corresponding to the color film substrate 6 is also fixedly connected to the cover plate. As such, the entire surface of the array substrate 4 close to the cover plate 1 is fixedly connected to the cover plate 1. The fixed connection may be implemented in many ways. For example, the surface of the array substrate 4 close to the cover plate 1 is directly bonded to the cover plate 1. For another example, the surface of the array substrate 4 close to the cover plate 1 is bonded to the cover plate 1 via at least one optical element having a planar structure.

For example, referring to FIG. 2, the display panel further includes an optically clear adhesive (OCA) layer 2 disposed between the array substrate 4 and the cover plate 1, and the OCA layer 2 is used for bonding the surface of the array substrate 4 close to the cover plate 1 to the cover plate 1. In this way, the array substrate 4 may be firmly bonded to the cover plate 1, and the cover plate 1 serves as a fixed support for the array substrate 4. Thus, it may be ensured that the end portion of the array substrate 4 including the bonding region C will not easily sway or break under the action of an external force, thereby improving the reliability of the display panel.

In some examples, the OCA layer 2 covers the entire surface of the array substrate 4 close to the cover plate 1. For example, dimensions of sides of the OCA layer 2 are equal to dimensions of corresponding sides of the array substrate 4 in a plane parallel to the surface of the array substrate 4 close to the cover plate 1. For another example, the dimensions of the sides of the OCA layer 2 are slightly greater than the dimensions of corresponding sides of the array substrate 4 in the plane parallel to the surface of the array substrate 4 close to the cover plate 1. In this case, the OCA layer 2 is appropriately expanded relative to the array substrate 4. The dimensions of the sides of the OCA layer 2 generally refer to dimensions of sides of an orthographic projection of the OCA layer 2 on the cover plate 1. For example, the orthographic projection of the OCA layer 2 on the cover plate 1 is a rectangle, and the dimensions of the sides of the OCA layer 2 include dimensions of long sides and short sides of the rectangle.

In some other examples, the OCA layer 2 partially covers the surface of the array substrate 4 close to the cover plate 1. For example, the dimensions of the sides of the OCA layer 2 are slightly less than the dimensions of the corresponding sides of the array substrate 4 in the plane parallel to the surface of the array substrate 4 close to the cover plate 1. In this case, the OCA layer 2 is appropriately retracted relative to the array substrate 4. It will be understood that in a case where the OCA layer 2 partially covers the surface of the array substrate 4 close to the cover plate 1, the dimensions of the sides of the OCA layer 2 will not be too small, so as to ensure that a portion of the surface of the array substrate 4 close to the cover plate 1 corresponding to the bonding region C is fixedly connected to the cover plate 1.

For example, referring to FIG. 3, the display panel is a liquid crystal display panel, and the liquid crystal display panel further includes a liquid crystal layer 5 disposed between the array substrate 4 and the color film substrate 6. The liquid crystal display panel further includes a first polarizer 31 disposed on the side of the array substrate 4 close to the cover plate 1, and the first polarizer 31 is bonded to the cover plate 1 via the OCA layer 2. The liquid crystal display panel further includes a second polarizer 32 disposed on a side of the color film substrate 6 away from the array substrate 4. In some examples, the liquid crystal layer 5 is integrated in the array substrate 4 in advance. Thus, the display panel may have an integrated liquid crystal display (LCD)-array substrate structure.

The first polarizer 31 generally adopts a thin sheet structure. The display panel further includes an adhesive disposed on a mounting surface of the first polarizer 31, and the adhesive is used to firmly bond the first polarizer 31 to the array substrate 4. The first polarizer 31 is firmly bonded to the cover plate 1, for example, via the OCA layer 2. Thus, the cover plate 1 serves as a fixed support for the first polarizer 31, and the first polarizer 31 serves as a fixed support for the array substrate 4. In this way, it may be ensured that the end portion of the array substrate 4 having the bonding region C will not easily sway or break under the action of an external force, thereby improving the reliability of the display panel.

Figure 4A:
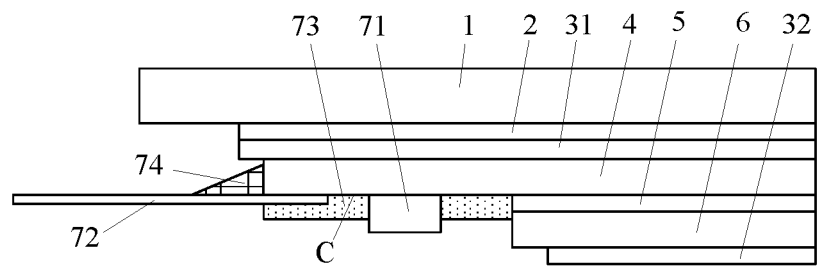
FIGS. 4A, 4B, 4C and 4D are schematic diagrams showing structures of four other display panels, in accordance with some embodiments.
Figure 4B:
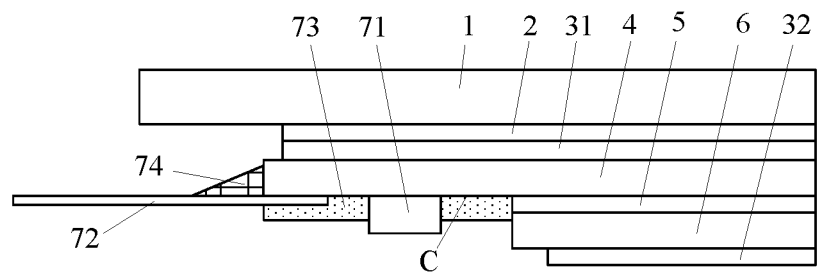
Figure 4C:
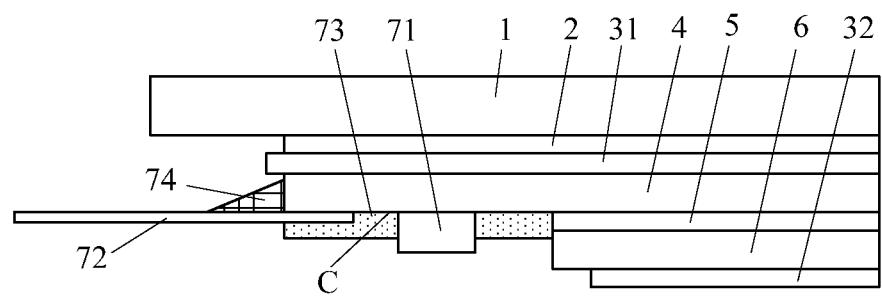

In some examples, the first polarizer 31 covers the entire surface of the array substrate 4 close to the cover plate 1. For example, dimensions of sides of the first polarizer 31 are equal to the dimensions of the corresponding sides of the array substrate 4 in the plane parallel to the surface of the array substrate 4 close to the cover plate 1, as shown in FIG. 3. For another examples, the dimensions of the sides of the first polarizer 31 are slightly greater than the dimensions of the corresponding sides of the array substrate 4 in the plane parallel to the surface of the array substrate close to the cover plate, as shown in FIGS. 4A and 4C. In this case, the first polarizer 31 is appropriately expanded relative to the array substrate 4. The dimensions of the sides of the first polarizer 31 generally refer to dimensions of sides of an orthographic projection of the first polarizer 31 on the cover plate 1. For example, the orthographic projection of the first polarizer 31 on the cover plate 1 is a rectangle, and the dimensions of the sides of the first polarizer 31 include dimensions of long sides and short sides of the rectangle.

Figure 4D:
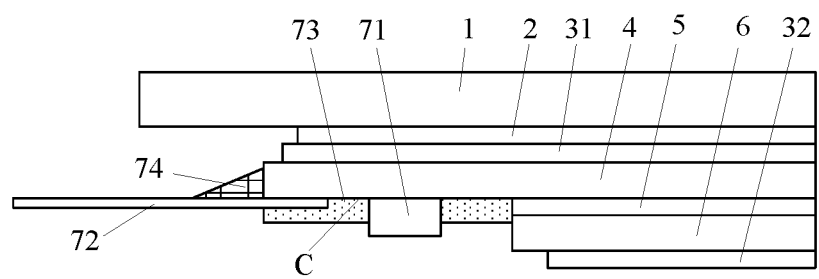

In some other examples, the polarizer 31 partially covers the surface of the array substrate 4 close to the cover plate 1. For example, the dimensions of the sides of the first polarizer 31 are slightly less than the dimensions of the corresponding sides of the array substrate 4 in a plane parallel to the surface of the array substrate 4 close to the cover plate 1, as shown in FIGS. 4B and 4D. In this case, the first polarizer 31 is appropriately retracted relative to the array substrate 4. It will be understood that, although a thickness of the first polarizer 31 is small, in a case where the first polarizer 31 partially covers the surface of the array substrate 4 close to the cover plate 1, the dimensions of the sides of the first polarizer 31 will not be too small, so as to avoid a large gap between the surface of the array substrate 4 close to the cover plate 1 and the cover plate 1, i.e., to avoid a gap between the portion of the surface of the array substrate 4 close to the cover plate 1 corresponding to the bonding region C and the cover plate 1. Of course, in a case where the dimensions of the sides of the first polarizer 31 are too small, that is, there is a large gap between the surface of the array substrate 4 close to the cover plate 1 and the cover plate 1, in a subsequent assembly process of the display panel, it is necessary to encapsulate the gap using an encapsulating adhesive or an encapsulating housing, so as to ensure the reliability of the finished display panel.

Similarly, in some examples, the first polarizer 31 is bonded to the cover plate 1 via the OCA layer 2, and the OCA layer 2 covers the entire surface of the first polarizer 31 away from the array substrate 4. For example, the dimensions of the sides of the OCA layer 2 are equal to dimensions of corresponding sides of the first polarizer 31, as shown in FIGS. 4A and 4B. For another example, the dimensions of the sides of the OCA layer 2 are slightly greater than the dimensions of the corresponding sides of the first polarizer 31. In this case, the OCA layer 2 is appropriately expanded relative to the first polarizer 31. In some other examples, the OCA layer 2 partially covers the surface of the first polarizer 31 away from the array substrate 4. For example, the dimensions of the sides of the OCA layer 2 are slightly less than the dimensions of the corresponding sides of the first polarizer 31, as shown in FIGS. 4C and 4D. In this case, the OCA layer 2 is appropriately retracted relative to the first polarizer 31. The dimensions of the corresponding sides of the first polarizer 31 refer to dimensions of sides, which correspond to the sides of the OCA layer 2, of an orthographic projection of the first polarizer 31 on the cover plate 1. It will be understood that in a case where the OCA layer 2 partially covers the surface of the first polarizer 31 away from the array substrate 4, the dimensions of the sides of the OCA layer 2 will not be too small, so as to ensure that the portion of the surface of the array substrate 4 close to the cover plate 1 corresponding to the bonding region C is fixedly connected to the cover plate 1.

With continued reference to FIG. 3, in some embodiments, the display panel further includes at least one circuit bonded to the bonding region C of the array substrate 4, and the at least one circuit includes at least one of an IC 71 or an FPC 72. In order to protect the bonding region C of the array substrate 4 and a conductive connection between the at least one circuit and the bonding region C from water, in some embodiments, the display panel further includes a glue protection layer 73 coated on the bonding region C of the array substrate 4, and the glue protection layer 73 partially covers or does not cover the at least one circuit according to actual needs. In some examples, the glue protection layer 73 partially covers or does not cover the IC. In some examples, the glue protection layer 73 partially covers or does not cover the FPC. For example, the glue protection layer 73 does not cover the IC, and partially covers the FPC. A material of the glue protection layer 73 may be selected according to actual needs.

In some embodiments, the array substrate 4 is a thin film transistor (TFT) array substrate. The bonding region of the TFT array substrate is generally bonded with an FPC, and the FPC is configured to control a display function of the TFT array substrate.

In some other embodiments, the array substrate 4 is a thin film transistor liquid crystal display (TFT-LCD) array substrate. In some examples, the bonding region of the TFT-LCD array substrate adopts a Chip On Glass (COG) structure, that is, the bonding region of the TFT-LCD array substrate is bonded with the IC and FPC. In some other examples, the bonding region of the TFT-LCD array substrate adopts a Chip On Film (COF) structure, that is, the IC is integrated into the FPC, and the FPC is bonded onto the bonding region of the TFT-LCD array substrate. The IC is configured to drive the LCD in the TFT-LCD array substrate, and the FPC is configured to control a display function of the TFT-LCD array substrate.

Figure 5:
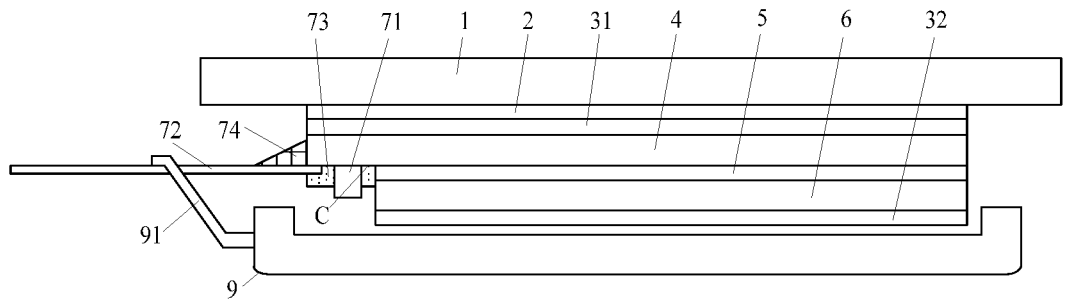
FIG. 5 is a schematic diagram showing a structure of a display device, in accordance with according to some embodiments.
Figure 6:
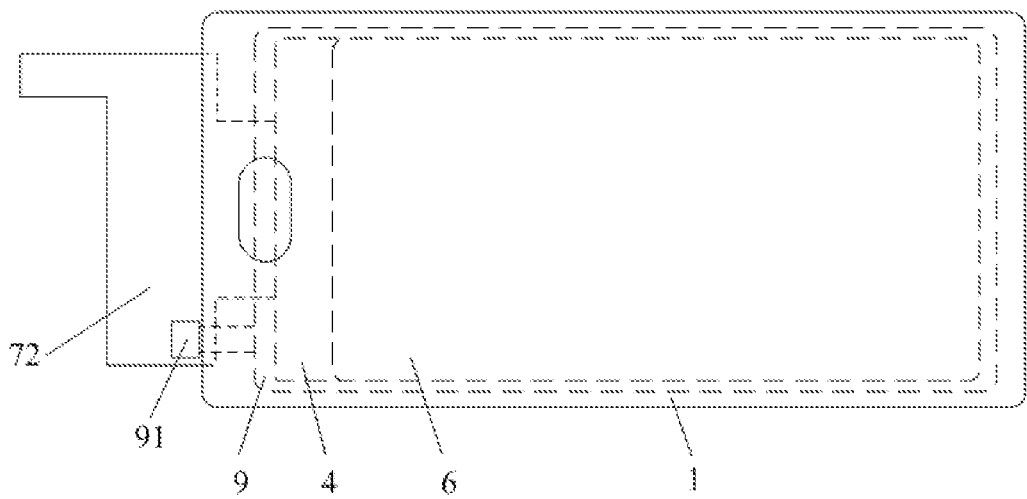
FIG. 6 is a schematic top view showing a structure of the display device shown in FIG. 5, in accordance with some embodiments.

Referring to FIGS. 3, 5 and 6, the at least one circuit includes the FPC 72, and most of a body of the FPC 72 protrudes from the end portion of the array substrate having the bonding region C. In order to ensure that the FPC 72 is stably bonded to the bonding region C of the array substrate 4, in some embodiments, the display panel further includes a Kapton tape 74 for bonding the surface of the FPC 72 close to the cover plate 1 to the end portion of the array substrate having the bonding region C. The Kapton tape 74 is usually coated in lines. As such, the surface of the FPC 72 close to the cover plate 1 may be firmly bonded to the end portion of the array substrate 4, so as to provide additional support for the FPC 72. Of course, a bonding manner of the Kapton tape 74 bonding the end portion of the array substrate 4 to the FPC may be applicable to other similar components in the at least one circuit to be bonded.

Figure 7:
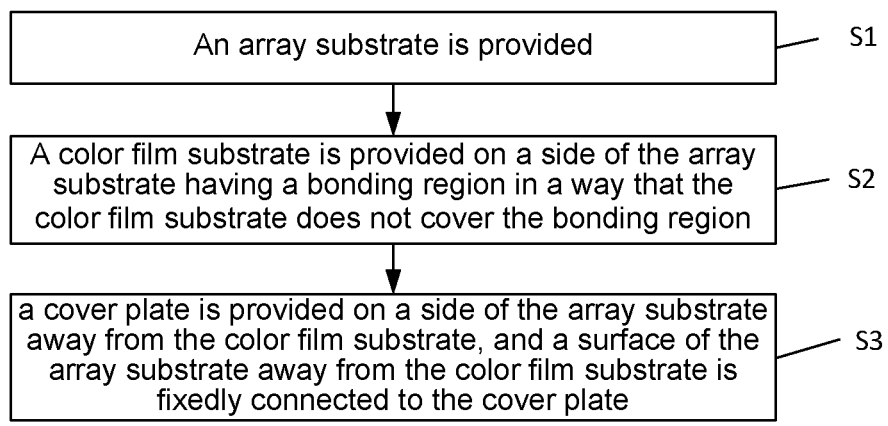
FIG. 7 is a flow chart of a method of manufacturing a display panel, in accordance with some embodiments.
Figure 8:
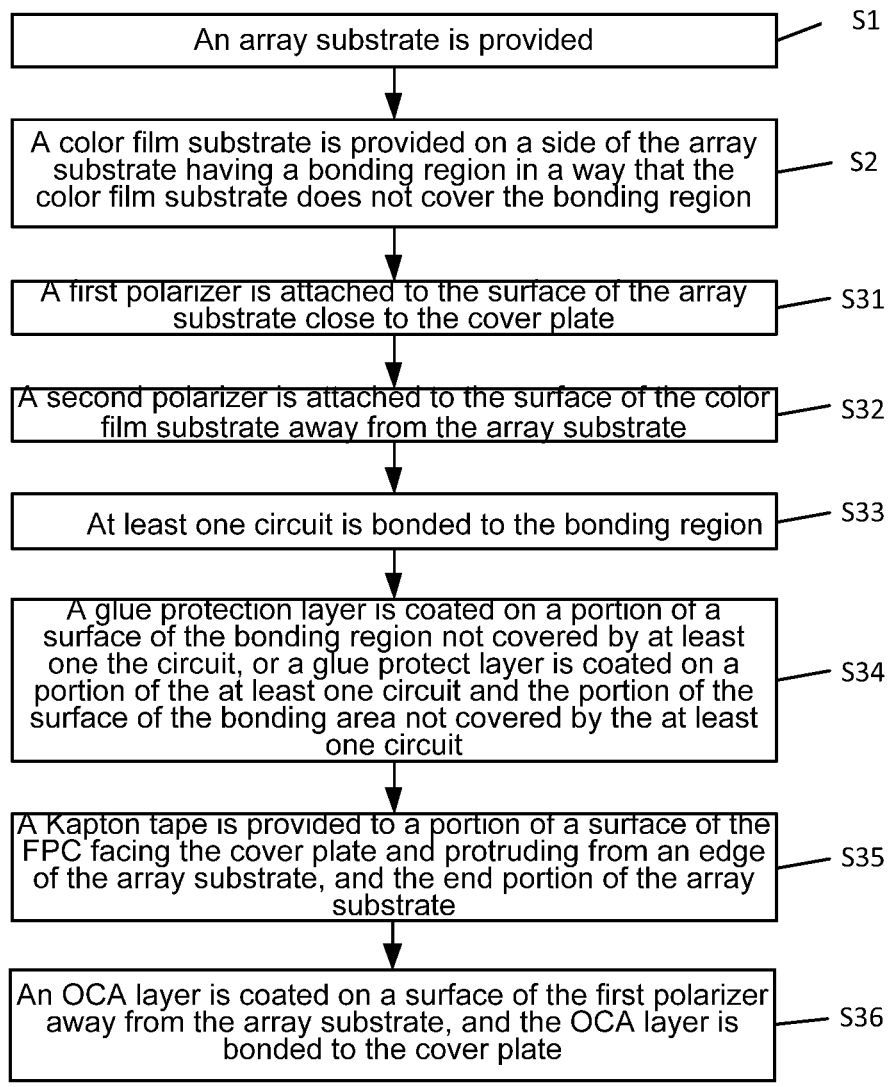
FIG. 8 is a flow chart of another method of manufacturing a display panel, in accordance with some embodiments.

Some embodiments of the present disclosure provide a method of manufacturing a display panel. The display panel is for example the display panel described in the above embodiments. With reference to FIGS. 7 and 8, the method includes step 1 to step 3 (S1-S3).

In S1, an array substrate is provided. The array substrate generally includes a TFT array substrate, or a TFT-LCD array substrate.

In S2, a color film substrate is provided on a side of the array substrate having a bonding region in a way that the color film substrate does not cover the bonding region. In a case where the array substrate is an LCD-TFT array substrate, the color film substrate is generally assembled face to face with the LCD-TFT array substrate.

In S3, a cover plate is provided on a side of the array substrate away from the color film substrate, and a portion of a surface of the array substrate away from the color film substrate corresponding to the bonding region is fixedly connected to the cover plate. The cover plate usually includes a glass cover plate for display or a glass cover plate for touch display.

It will be noted that the method of manufacturing the display panel may be achieved not completely in accordance with the above steps and the order of the above steps. In some examples, the order of some of the above steps may be changed. For example, S3 is performed before S2 is performed. In some examples, steps of the method may be omitted or new steps may be added into the method. For example, a step of cleaning the cover plate may be added before performing S3.

The fixed connection between the surface of the array substrate away from the color film substrate and the cover plate may be implemented in various ways. For example, the surface of the array substrate away from the color film substrate is bonded to the cover plate.

For example, the S3, in which a cover plate is provided on the side of the array substrate away from the color film substrate, includes the following steps. An OCA layer is coated on the surface of the array substrate away from the color film substrate, so as to bond the array substrate to the cover plate via the OCA layer. In this way, the array substrate may be firmly bonded to the cover plate, so that the cover plate serves as a fixed support for the array substrate. Thus, it may be ensured that the end portion of the array substrate having the bonding region C will not easily sway or break under the action of an external force, thereby improving the reliability of the display panel.

As mentioned above, the OCA layer may cover the entire surface of the array substrate 4 close to the cover plate. Of course, the OCA layer may partially cover the surface of the array substrate close to the cover plate.

In some other examples, the array substrate is an LCD-TFT array substrate, and the display panel is a liquid crystal display panel. The S3, in which a cover plate is provided on the side of the array substrate away from the color film substrate, includes the following steps. A first polarizer is attached to the surface of the array substrate close to the cover plate, as shown in S31 in FIG. 8, the OCA layer is coated on a surface of the first polarizer away from the array substrate, and the OCA layer is bonded to the cover plate, as shown in S36 in FIG. 8.

The first polarizer usually adopts a thin sheet structure, and a mounting surface of the first polarizer is generally coated with an adhesive to firmly attach the first polarizer to the surface of the array substrate close to the cover plate. The first polarizer is firmly bonded to the cover plate via the OCA layer, so that the cover plate serves as a fixed support for the first polarizer, and the first polarizer serves as a fixed support for the array substrate. In this way, it may be ensured that the end portion of array substrate having the bonding region will not easily sway or break under the action of an external force, thereby improving the reliability of the display panel.

As mentioned above, the first polarizer may cover the entire surface of the array substrate close to the cover plate. The first polarizer may also partially cover the surface of the array substrate close to the cover plate. For example, the first polarizer is appropriately retracted relative to the array substrate. Of course, if the dimensions of the sides of the first polarizer are too small, in a subsequent assembly process of the display panel, a gap may be encapsulated using an encapsulating adhesive or an encapsulating housing, so as to ensure the reliability of the finished display panel.

Similarly, in a case where the first polarizer is bonded to the cover plate via the OCA layer, the OCA layer may cover the entire surface of the first polarizer 31 away from the array substrate. Of course, the OCA layer may partially cover the surface of the first polarizer away from the array substrate.

In some embodiments, the method of manufacturing the display panel further includes: attaching a second polarizer to the surface of the color film substrate away from the array substrate, as shown in S32 in FIG. 8.

With continued reference to FIG. 8, in some embodiments, the method of manufacturing the display panel further includes the following steps. Before coating the OCA layer, at least one circuit is bonded to the bonding region, as shown in S33 in FIG. 8. A glue protection layer is coated on a portion of a surface of the bonding region not covered by at least one the circuit so as to protect the bonding region of the array substrate from water. Alternatively, a glue protect layer is coated on a portion of the at least one circuit and the portion of the surface of the bonding area not covered by the at least one circuit, so as to protect the bonding region of the array substrate and a conductive connection of the at least one circuit from water, as shown in S34 in FIG. 8. The at least one circuit usually include at least one of an IC or an FPC. As described above, the array substrate usually includes a TFT array substrate, or an LCD-TFT array substrate.

As described above, in some examples, in order to ensure that the FPC is stably bonded to the bonding region of the array substrate, the method further includes the following step. A Kapton tape is provided to bond the surface of the FPC facing the cover plate to an end portion of the array substrate having the bonding region C. That is, the Kapton tape is provided to a portion of a surface of the FPC facing the cover plate and protruding from an edge of the array substrate, and the end portion of the array substrate, as shown in S35 in FIG. 8.

Some embodiments of the present disclosure provide a display device. Referring to FIGS. 5 and 6, the display device includes the display panel provided by the above embodiments, and a backlight module 9 disposed on a back side of the display panel.

The backlight module 9 usually includes a backlight, such as an array of light-emitting diodes (LEDs), and an LED-FPC 91 for controlling the array of LEDs.

The display device provided by some embodiments of the present disclosure may be a product or component having a display function or a touch function, such as a mobile phone, a tablet computer, a notebook computer, a display, a television, a digital photo frame, and a navigator.

The foregoing descriptions are merely some implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A display panel, comprising:
   a cover plate;
   an array substrate disposed on a side of the cover plate, wherein an edge of a surface of the array substrate away from the cover plate includes a bonding region for bonding at least one circuit, and a portion of a surface of the array substrate close to the cover plate corresponding to the bonding region is fixedly connected to the cover plate;

an opposite substrate disposed on a side of the array substrate away from the cover plate, wherein the opposite substrate is assembled with the array substrate;

at least one circuit bonded to the bonding region of the array substrate, wherein one of the at least one circuit protrudes from the edge of the surface of the array substrate away from the cover plate;

a Kapton tape for bonding the one of the at least one circuit to an end portion of the array substrate having the bonding region, wherein the Kapton tape is configured to be coated in lines; and a glue protection layer coated on the bonding region of the array substrate, wherein the glue protection layer does not cover or partially covers the at least one circuit.

2. The display panel according to claim 1, wherein the opposite substrate is a color film substrate, and the color film substrate does not cover the bonding region.

3. The display panel according to claim 2, wherein a portion of the surface of the array substrate close to the cover plate corresponding to the color film substrate is fixedly connected to the cover plate.

4. The display panel according to claim 3, further comprising:
a first polarizer disposed on a side of the array substrate close to the cover plate, and
an optically clear adhesive layer disposed between the first polarizer and the cover plate, and the optically clear adhesive layer being used for bonding the first polarizer to the cover plate.

5. The display panel according to claim 4, wherein the first polarizer completely covers or partially covers the surface of the array substrate close to the cover plate.

6. The display panel according to claim 5, wherein the first optically clear adhesive layer completely covers or partially covers a surface of the first polarizer away from the array substrate.

7. The display panel according to claim 6, further comprising:
a liquid crystal layer disposed between the array substrate and the color film substrate; and
a second polarizer disposed on a side of the color film substrate away from the array substrate.

8. The display panel according to claim 3, further comprising an optically clear adhesive layer disposed between the array substrate and the cover plate, and the optically clear adhesive layer being used for bonding the surface of the array substrate close to the cover plate to the cover plate.

9. The display panel according to claim 8, wherein the optically clear adhesive layer completely covers or partially covers the surface of the array substrate close to the cover plate.

10. A method of manufacturing the display panel according to claim 1, comprising:
providing an array substrate, an edge of a surface of the array substrate including a bonding region;
placing a cover plate on another surface of the array substrate opposite to the bonding region, and fixedly connecting a portion of the another surface of the array substrate corresponding to the bonding region to the cover plate;
providing an opposite substrate, and assembling the opposite substrate with the array substrate;
bonding at least one circuit to an end portion of the array substrate having the bonding region by a Kapton tape, wherein one of the at least one circuit protrudes from the edge of the surface of the array substrate away from the cover plate, and the Kapton tape is configured to be coated in lines; and
coating a glue protection layer on a portion of a surface of the bonding region not covered by the at least one circuit; or, coating a glue protection layer on a portion of the at least one circuit and the portion of the surface of the bonding region not covered by the at least one circuit.

11. The method of manufacturing the display panel according to claim 10, wherein assembling the opposite substrate with the array substrate, includes: placing the opposite substrate on a side of the array substrate including the bonding region in a way that the opposite substrate does not cover the bonding region after being assembled.

12. The method of manufacturing the display panel according to claim 11, wherein placing the cover plate on another surface of the array substrate opposite to the bonding region, includes:
coating an optically clear adhesive layer on the another surface of the array substrate opposite to the bonding region, so as to bond the array substrate to the cover plate via the optically clear adhesive layer;
or, attaching a first polarizer to the another surface of the array substrate opposite to the bonding region, and coating an optically clear adhesive layer on a surface of the first polarizer away from the array substrate, so as to bond the array substrate to the cover plate via the optically clear adhesive layer.

13. A display device, comprising:
the display panel according to claim 1; and
a backlight module disposed on a back side of the display panel that is opposite to a display side thereof.

* * * * *